(12) United States Patent
Ellis (10) Patent No.: US 7,527,461 B2
(45) Date of Patent: May 5, 2009

(54) SAFETY RAIL ASSEMBLY

(76) Inventor: J. Nigel Ellis, 306 Country Club Dr., Wilmington, DE (US) 19803

( * ) Notice: Subject to any disclaimer, the term of this patent is extended or adjusted under 35 U.S.C. 154(b) by 0 days.

(21) Appl. No.: 11/562,999

(22) Filed: Nov. 23, 2006

(65) Prior Publication Data

US 2007/0114507 A1 May 24, 2007

Related U.S. Application Data (60) Provisional application No. 60/739,014, filed on Nov. 23, 2005.

(51) Int. Cl.
*B60P 3/06* (2006.01)
(52) U.S. Cl. .............................. 410/4; 410/24; 410/24.1; 410/26
(58) Field of Classification Search ... 403/109.1–109.8; 182/45, 113; 280/476.1; 410/4, 24, 24.1, 410/26
See application file for complete search history.

(56) References Cited

U.S. PATENT DOCUMENTS

| 3,010,755 | A | | 11/1961 | Black |
|---|---|---|---|---|
| 3,776,521 | A | | 12/1973 | Weinert |
| 4,374,592 | A | * | 2/1983 | Geary et al. ............. 280/476.1 |
| 6,012,547 | A | | 1/2000 | Sykes |
| 6,045,489 | A | * | 4/2000 | Levine et al. |
| 6,168,548 | B1 | * | 1/2001 | Fleming |
| 6,857,677 | B1 | | 2/2005 | Giles et al. |
| 7,175,534 | B2 | * | 2/2007 | Liggett |
| 2001/0032435 | A1 | * | 10/2001 | Austin |

* cited by examiner

*Primary Examiner*—Victor MacArthur
(74) *Attorney, Agent, or Firm*—Sherr & Vaughn, PLLC (57) ABSTRACT

A safety rail assembly for mounting on a deck of a transport carrier which transports and supports thereon at least one automobile having at least one of passenger and driver-side doors. The portable safety rail assembly includes a handrail extending horizontally relative to the upper surface of the deck and support posts for supporting the handrail. Each support post may be removeably mounted to the deck to permit selective vertical displacement of the handrail relative to the upper surface of the deck for positioning the handrail at a desired height above the upper edge of a door of the transported vehicle. The desired height permits unobstructed opening and closing of the doors and safe entrance into and egress from the interior of the automobile.

19 Claims, 9 Drawing Sheets

SAFETY RAIL ASSEMBLY

CROSS-REFERENCE TO RELATED APPLICATION

This application claims the benefit of U.S. Provisional Patent Application No. 60/739,014 filed Nov. 23, 2005.

BACKGROUND OF THE INVENTION

1. Field of the Invention

A safety rail assembly composed provided on a working platform of a transport carrier for automobiles. The safety rail assembly forms a continuous fence to help mitigate or otherwise reduce occupational injuries resulting from falls from the deck platform.

2. Description of the Related Art

Occupational injuries resulting from falls are a known hazard on transport carriers for automobiles, many such falls resulting in a disabling injury or death to the driver and/or operator. Fall deaths in industry are approximately 10% of the total up to 10 ft fall heights. Approximately 14% of all deaths are from falls in industry.

Accordingly, there exists a need for a safety rail assembly for mitigating or otherwise reducing the number of deaths and injuries resulting from driver and/or operator falls from the upper or raised deck of the carrier. Particularly, the provision of a safety rail will protect the user, i.e., the driver and/or operator, who has a natural inclination to steady themselves to maintain their balance under a variety of operating conditions. This workplace on the upper or raised deck(s) is covered under the 29 C.F.R. §1910.23(c) requirement for edge fall protection with a trigger height of four feet or more to control the fall hazard. Application of this Federal Rule can be found under §1910.132 for fall arrest, §1917 for marine terminals or §5(a)(1) under the Occupational Safety and Health Administration (OSHA) Act requiring employers to furnish a place of employment free from recognized hazards that cause or are likely to cause death or serious physical harm to employees and requires any such employer to comply with occupational safety standards promulgated under the OSHA Act.

SUMMARY OF THE INVENTION

In view of the foregoing, it is an object of the present invention to provide a safety rail assembly for transport carriers having one or more working surfaces or decks adaptable for supporting various cargo such as automobiles, namely cars, trucks, sports utility vehicles (SUVs), etc.

It is another object of the invention to provide a safety rail assembly for single or multi-deck transport carriers which mitigate or otherwise reduce various occupational injuries resulting from falls from the deck.

It is a further object of the invention to provide a safety rail system including a plurality of safety rail assemblies spatially positioned adjacent to one another along the periphery of the deck to form a continuous fence permitting a driver and/or operator to traverse the working surface of the deck without losing their balance, even under hazardous surface conditions such as rain, ice, snow, etc.

It is still another object of the invention to provide a safety rail assembly composed of materials that are lightweight yet robust enough to withstand various forces during use.

It is yet another object of the invention to provide a safety rail assembly that may be easily assembled and disassembled on site.

Yet another object of the invention is to provide a safety rail assembly that permits a driver and/or operator to maintain his/her balance on the deck while traversing thereon.

Still another object of the invention is to provide a safety rail assembly that permits unobstructed, i.e., unhindered, opening and closing of the driver-side and/or passenger door of an automobile that is positioned and/or secured on the deck to enable safe entrance into and egress from the interior of the automobile.

Yet and still another object of the invention is to provide a safety handrail assembly having a handrail whose height relative to the working surface of the deck may be manually or automatically adjusted to a desired level above the upper edge of the driver-side and/or passenger door, i.e., the door frame and/or window, of an automobile that has been secured on the deck.

It is still a further object of the invention to provide a safety rail assembly having a fall arrest safety assembly that prevents the driver and/or operator from falling from the deck, even during instances of hazardous conditions.

It is yet further object of the invention to provide a safety rail assembly having a bifurcated support post design permitting selective adjustments to be made to the height of the assembly.

Yet a further object of the invention is to provide a safety rail assembly having a removable connection between the support post and the deck that permits selective adjustments to be made to the height of the assembly.

These, as well as other objects and characteristics of the present invention may be achieved in accordance with an aspect of the invention which includes a safety rail assembly having a plurality of U-shaped rail assemblies spanning the length of the working surface or deck of a transport carrier. Such a safety rail assembly will thus permit a user, in which case may be a driver and/or operator, to maintain his/her balance on the deck while traversing thereon, even during instances of hazardous deck conditions. Each safety rail assembly may include a horizontally extending handrail supported at each end by a pair of vertically extending support posts, and a retaining assembly for removeably securing each support post to the deck of the transport carrier while also permitting the height of the assembly to be selectively adjusted vertically with respect to the upper surface of the deck.

Particularly, the distance between the handrail and the upper surface of the deck of the transport carrier may be selectively adjusted to a desired level above the upper edge of a driver-side or passenger door of an automobile that has been secured to the deck. In this way, the driver and/or operator may, without obstruction or hinderence, open and close the door to provide entry into or egress out of the interior of the automobile.

Hence, the safety rail assembly is selectively moveable vertically, i.e., in downward and/or upward directions relative to the surface of the deck, to a desired height that does not hinder, obstruct or otherwise interfere with the driver-side or passenger door when access to the interior of the automobile is required. Such a feature is advantageous in view of the varying distances between the upper edge of certain automobile doors and the upper surface of the deck of the transport carrier. For instance, the door height, i.e., the distance between the upper edge of the door and the ground, of a standard SUV is larger than that of a conventional sedan or sports car. However, due to the selective adjustability of the safety rail assembly, notably the handrail, certain automobiles such as SUVs, sports cars, sedans and trucks may be loaded on the same deck without fear of the driver and/or operator falling from the deck, even during instances of hazardous surface conditions on the deck.

Advantageous of the invention may also be achieved from a portable safety rail assembly that may be assembled and disassembled on site. Such an assembly includes a handrail that extends horizontally relative to the upper surface of the deck, at least one support post for supporting the support rail, a retaining assembly that permits selective adjustments to be made to the height of the handrail relative to the working surface of the deck, and a fall arrest safety assembly that provides additional safety protection against falls from the deck.

The handrail includes a gripping surface that permits the driver and/or operator to maintain his/her balance on the deck while traversing thereon. Each support posts includes a first end that supports the handrail and a second end removeably mounted to the deck via the retaining assembly to thereby permit selective vertical displacement of the handrail relative to the working surface of the deck. Such selective adjustment of the height of the handrail to a desired level above the upper edge of the driver-side or passenger door permits unobstructed opening and closing of the door and safe entrance into and egress from the interior of the automobile.

The fall arrest safety assembly is removeably secured to the handrail and includes a longitudinal slot which extends underneath the surface of the handrail and sized to receive a latch mechanism that is slidable within the slot, and a length of flexible chord having a first end securely attached to the latch mechanism and a second distal end securely attached to a safety harness to be worn by the driver and/or operator. Alternatively or in combination, the fall arrest assembly may include a plurality of safety rings removeably attached to the handrail for sliding engagement thereon and attached to the chord-harness combination. In such an embodiment, a Y-type lanyard mechanism having double-locking snap hooks may be utilized. In order to prevent the safety rings from moving from the handrail to the support posts, a pair of stop mechanisms may also be provided on respective ends of the handrail. These stop mechanisms serve to stop or abut the safety rings when the wearer of the safety harness traverses the deck.

The retaining assembly includes a mechanical fastening assembly which removeably secures the lower base end of each support post to the deck. For instance, a plurality of apertures, holes or sockets may be incorporated into the upper surface of the deck for receiving and locking into place the lower base end of the support post. Alternatively, the outer peripheral surface of the deck may be provided with a plurality of open-ended brackets or collars having a channel sized to receive the lower base end of each support post. The lower end of each support post is provided with a series of apertures, slots, holes or notches while the outer surface of each cylinder is provided with a corresponding aperture, slot, hole or notch that, when aligned with the corresponding one of the collar, form a removable connection when a mechanical latch is inserted therein. This removable connection permits adjustment of the height of the handrail to a desired level that permits unobstructed opening and closing of the driver-side and/or passenger door.

Advantages of the invention may also be derived from a safety rail assembly adaptable for mounting on a deck of a transport carrier, the safety rail assembly including a handrail, telescopically moveable support posts, and the fall arrest safety assembly described hereinabove.

Such a handrail includes a gripping surface that permits a driver and/or operator to his/her balance on the deck while traversing thereon. Each telescopically moveable support post includes a first post section having a distal end for supporting the handrail and a second post section having a base end removeably mounted to the deck and a distal end sized to receive a base end of the first post section. Such a telescopic design facilitates selective vertical displacement between the support post sections, and thus, adjustments in height of the handrail to a desired level accommodating automobile doors of varying heights. Specifically, the height of the handrail may be adjustably moved to a desired level above the upper edge of the driver-side and/or passenger door to permit unobstructed use of the door while providing safe entrance into or egress from the interior of the automobile.

Further advantageous of the invention may also be derived from a safety rail assembly that includes a handrail supported by a pair of support posts, a retaining assembly that permits selective vertical displacement of the handrail, and a fall arrest safety assembly that prevents the driver and/or operator from falling from the deck while traversing thereon.

The handrail includes a gripping surface that permits a user to be safely guided while traversing the length of the deck. The retaining assembly permits selective displacement of the handrail in a plane substantially perpendicular to the plane of the upper surface of the deck to a desired height above the upper edge of the driver-side and/or passenger door. The fall arrest safety assembly is removeably secured to the handrail and includes a longitudinal slot extending underneath the surface of the horizontal bar for receiving a latch mechanism that is slidable within the slot, a length of flexible chord having a first end removeably secured to the latch mechanism and a second end removeably secured to a safety harness sized for receipt or otherwise worn by the driver and/or operator. In such an embodiment, a Y-type lanyard mechanism having double-locking snap hooks may be utilized.

Accordingly, the safety assembly set forth herein extends numerous advantages in its portability and adaptability to facilitate the quick and efficient loading and unloading of automobiles that have been secured on the deck of a transport carrier by mitigating or otherwise greatly reducing the threat of occupational hazards such as falls. The safety rail assembly may be used while the transport carrier is at rest to facilitate operator movement along the deck and thereby reduce instances of occupational injuries resulting from falls therefrom that have heretofore caused death or serious physical harm. Particularly, the use of a safety rail assembly on a single or multi-level deck of a transport carrier permits a user, i.e., a driver and/or operator to maintain his/her balance on the deck while traversing thereon.

Moreover, the ability to adjustably displace the safety rail assembly to a desired height such that the handrail is above the upper edge of the driver-side and/or passenger door facilitates the unobstructed opening and closing of such doors when the automobile is positioned on the deck. The safety rail assembly is beneficial due to its ease in assembly and disassembly, which provides savings in both time and money. A portable safety rail assembly is also ideal for single and multi-deck carriers, and may be sized for easy storage on the carrier. A safety rail assembly employing a telescopic support post design permits the manual adjustment of the handrail in a quick and efficient manner.

These and other objects, features and advantages of the invention will become more apparent from the following description when taken in conjunction with the detailed drawings that show, for purposes of illustration only, the preferred embodiments of the invention.

BRIEF DESCRIPTION OF THE DRAWINGS

The advantages of the invention will become more apparent to those skilled in the art in conjunction with the detailed description of the preferred embodiments, in which.

DESCRIPTION OF THE PREFERRED EMBODIMENTS

As illustrated in the drawing figures, provided herein is a safety rail assembly 10 for mounting to a deck 21 of a transport carrier 20 adapted for transporting and supporting thereon at least one automobile 30 having at least one driver-side and passenger door 31. The safety rail assembly 10 may include one or more U-shaped rails constituting a handrail 40 and stanchions or support posts 50 for supporting the handrail 40. In this regard, the use of multiple handrail assemblies 10 creates a continuous fence around the periphery of the deck 21 that assists the operator and/or driver to maintain proper balance on the deck, even during instances of hazardous deck conditions such as rain, ice, snow, etc.

Figure 1:
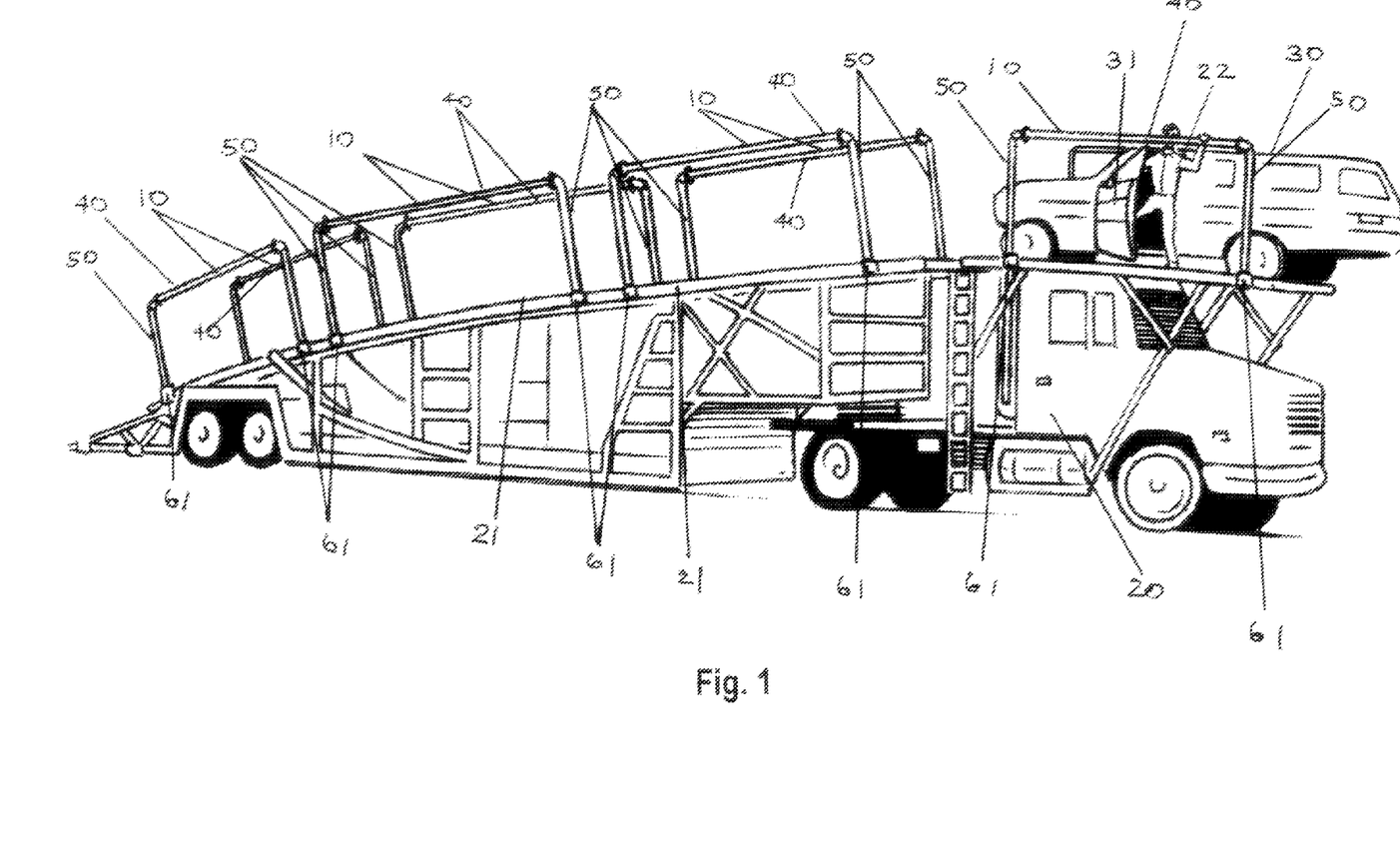
FIG. 1 is a perspective view of the safety rail assembly in connection with the upper platform deck of an transport carrier.
Figure 2:
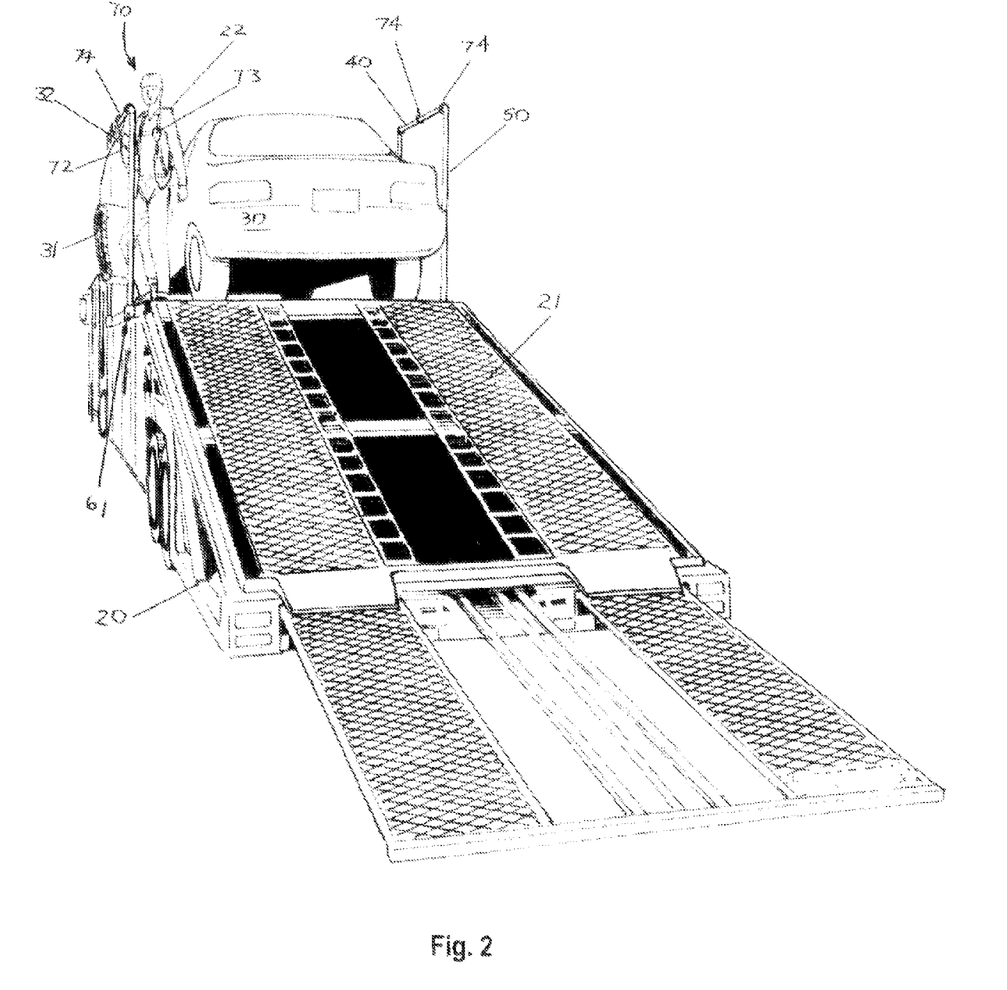
FIG. 2 is a perspective view of the safety hand rail assembly of FIG. 1 including a fall arrest safety assembly.

FIGS. 1 and 2 illustrate an eleven-car carrier 20 having upper deck protection for the driver and/or operator 22. An operator 22 drives one or more automobiles 30 up the ramp and engages the parking gear and the emergency brake before attaching chains or webbings at the front and rear wheels to safely secure each automobile 30 to the deck 21.

Figure 3:
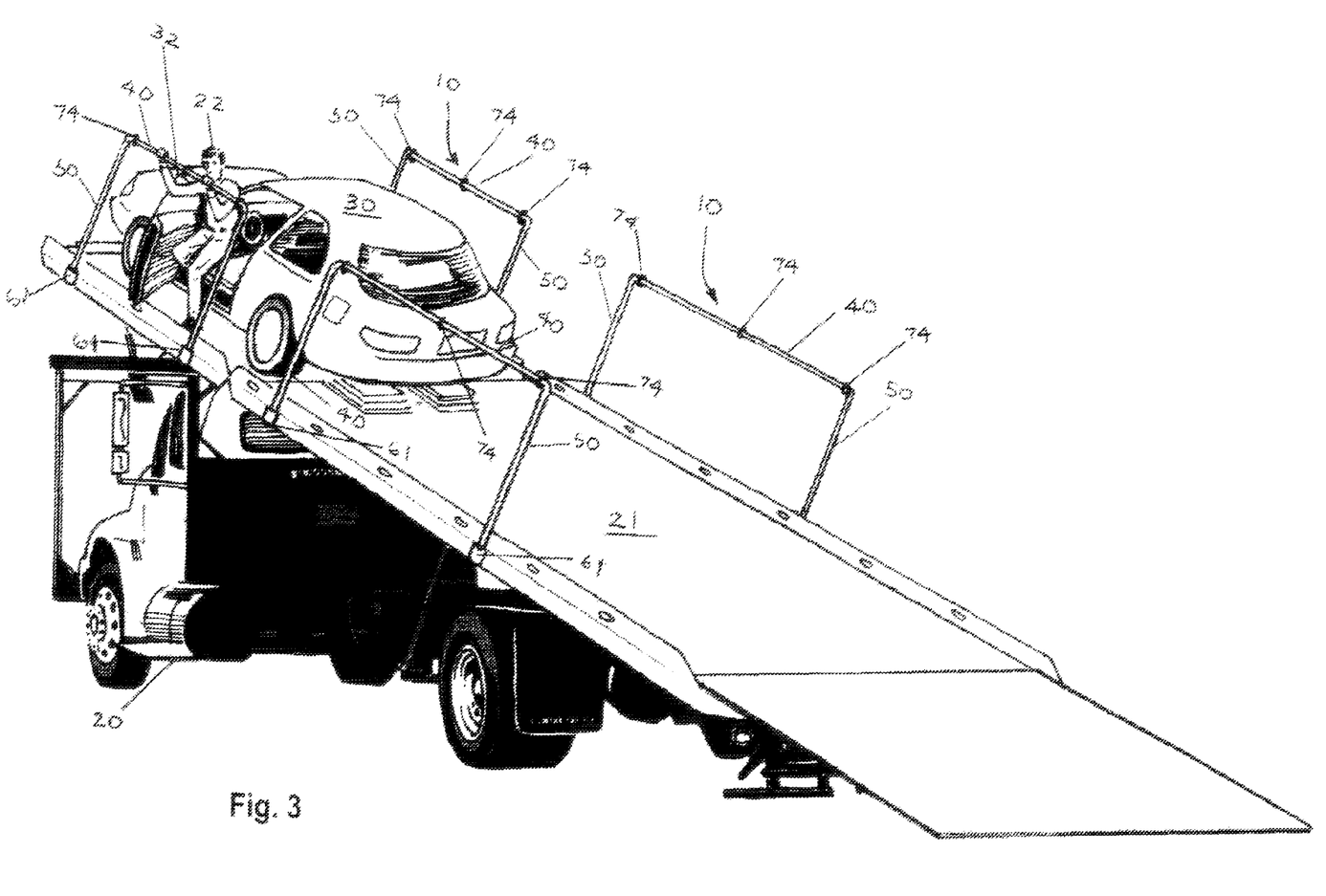
FIG. 3 is a perspective view of the safety rail assembly in connection with a single platform deck transport carrier.
Figure 4:
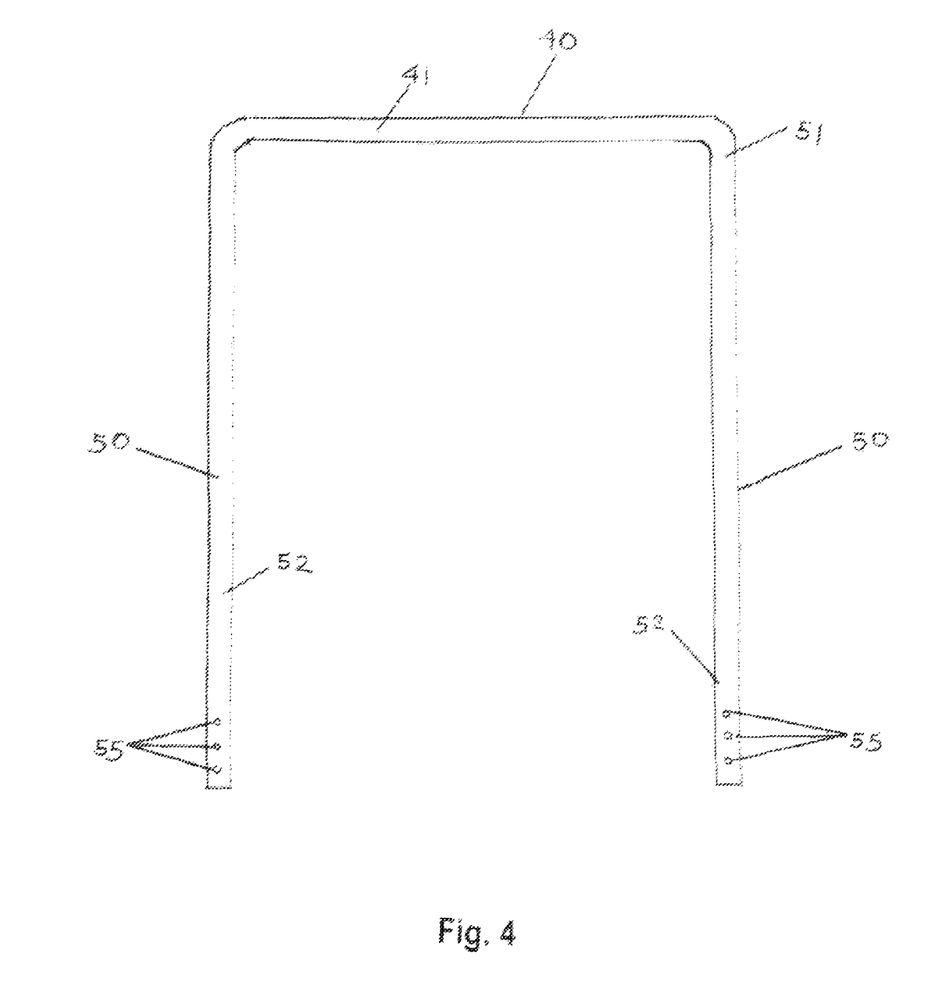
FIG. 4 is a front view of the handrail and support posts of the safety rail assembly.

Similarly, for three-car carriers shown in FIG. 3, the upper deck 21 is provided with a safety rail assembly 40 while the lower deck 21 is provided with a second assembly 40 for instances in which an operator has to lower and attach winch cables for elevating automobiles 30 and then engages the parking gear or alternatively disengages the parking gear and emergency brake in order to lower the automobile 30 via cable.

Since the range in height (roof-to-ground) of conventional automobiles 30 vary, in order to conform to the height of any passenger or driver-side door 31, the height of the handrail assembly 10 is adjustable relative to the working surface of the deck 21. Particularly, the height of the handrail 40 relative to the flatbed platform or deck 21 is manually adjustable to a desired level in relation to the height of the vehicle door 31, notably above the upper edge of the door frame and/or window, to enable unobstructed opening and closing of the door when the automobile 30 is positioned and/or secured on the deck 21. This height adjustment may be conducted automatically through manual, hydraulic and/or electric means. Thus, the height of the handrail assembly 10 may also be adjusted where local standards dictate, i.e., providing for a maximum height of automobiles when passing under a bridge. This is especially true for old municipalities where some bridges have only 12.5 ft headroom.

The handrail 40 extends horizontally relative to the upper surface of the deck 21 and has a gripping surface 41 permitting a user and/or carrier operator to be safely guided when traversing the deck 21. Each support post 50 has a first end 51 supporting the handrail 40 and a second end 52 removeably mounted to the deck 21 to permit selective vertical displacement of the handrail relative to the upper surface of the deck 21 for positioning the handrail 40 at a desired height 42 above the upper edge 32 of the door 31 of the automobile 30. This feature advantageously permits the driver and/or operator 22 to open and close without obstruction the door 31 and thereby provide safe entrance into and egress from the interior of the automobile 30.

Figure 7:
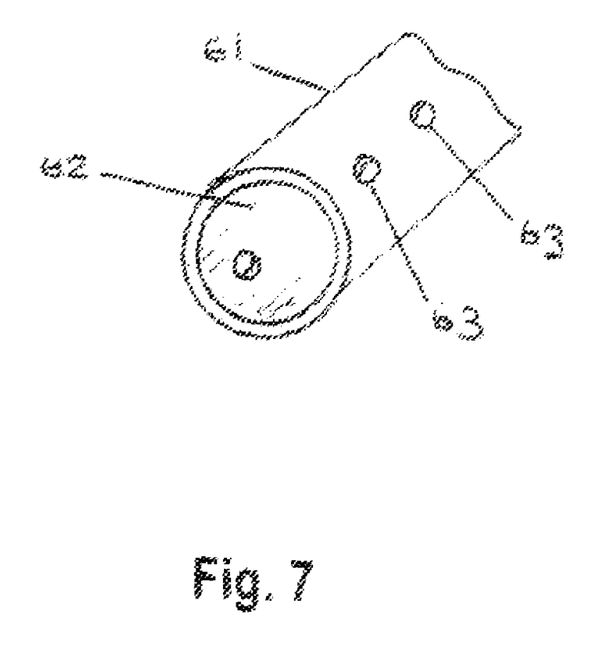
FIG. 7 is a side view of the retaining assembly.
Figure 8:
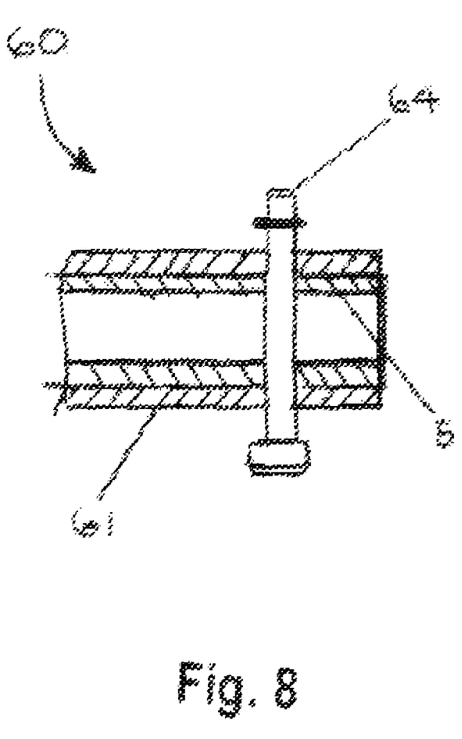
FIG. 8 is a perspective view of the collar of the retainer assembly used in combination with the support post shown in FIG. 6.

In order to securely attach the safety rail assembly 10 to the deck 21 while also permitting vertical height adjustments to the assembly 10, a retaining assembly 60 is provided and includes a plurality of sockets, brackets or collars 61 that may be securely or removeably attach to the deck 21, either on the top surface thereof or at the outer periphery as shown in the drawing figures. Each collar 61 has an open channel 62 therethrough sized to receive the second end 52 of the support post 50. The channel 62 permits vertical displacement of the support post 50 so that the height of the handrail 40 relative to the deck 21 may be set at a desired level above the door 31. The second end 52 of each support post 50 is provided with a plurality of holes 55 therethrough while the outer circumferential surface of each collar 61 is provided with an aperture or hole 63 therethrough that corresponds in size to the hole 55 provided on the post 50. When the holes 55, 63 are placed in axial alignment with the other, the posts 50 may be selectively locked or secured to the deck 21 through the insertion of one or more fasteners such as screws, bolts and the like 64 into the holes 55, 63. Such fasteners may take the form of a lag screw, safety snap pen, self-locking lynch pin, threaded bolt-screw arrangement or the like.

Spatially, the distance between support posts 50, i.e., the width of the safety rail assembly 10, may be up to 108 inches preferably between 102 to 108 inches. The handrail 40 can be maintained at a height of 66 inches for normal-sized cars such as sedans, but may exceed that height for larger vehicles such as trucks and SUVs. The spatial distance between each hole 55 on the support post may vary according to any specific requirement(s). The arrangement also facilitates the placement of the handrail 40 at a desired height above the automobile door 31 that permits the opening and closing of the door 31 when the automobile 30 is secured to the deck 21.

Figure 5:
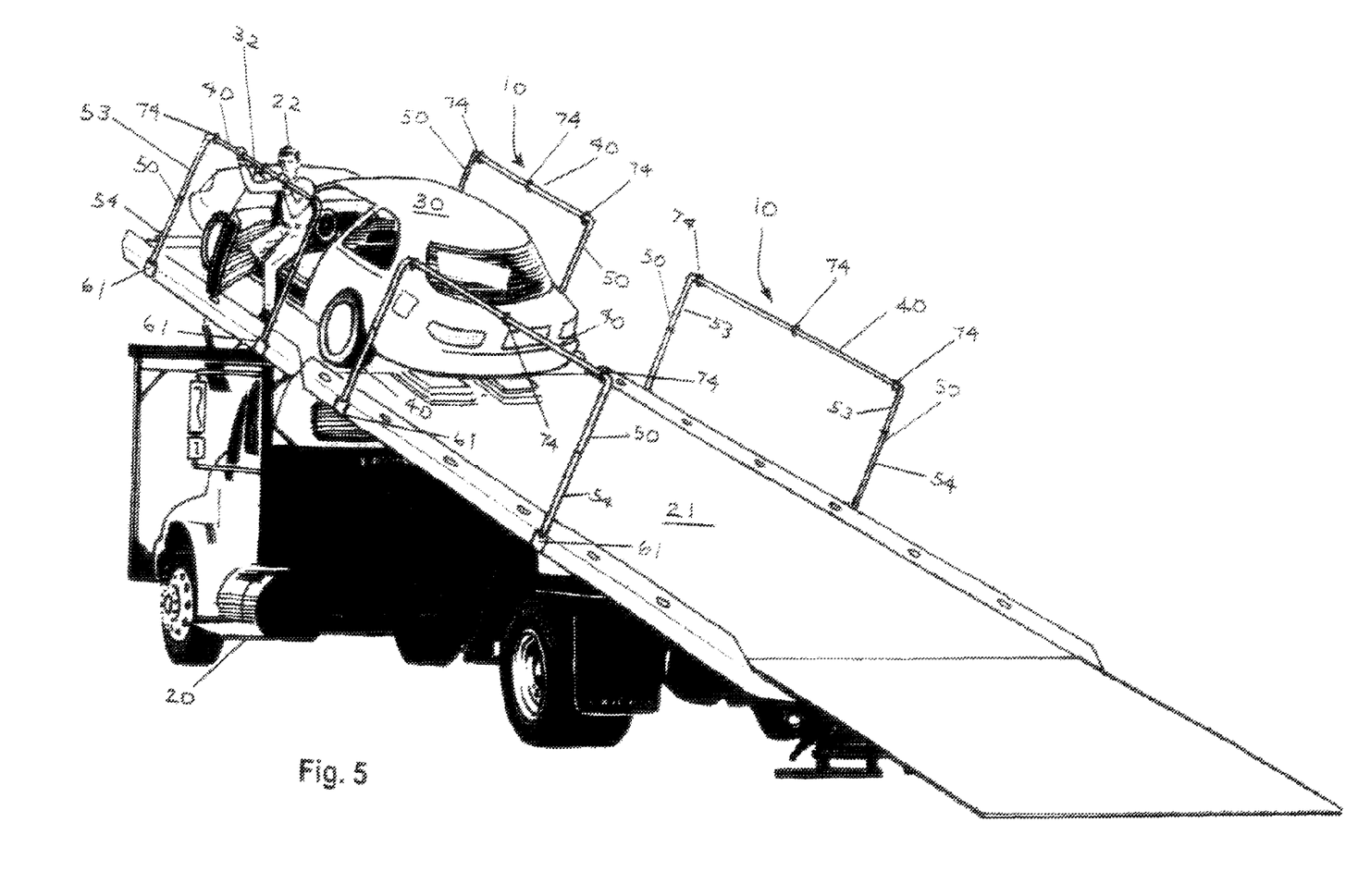
FIG. 5 is a front view of the safety rail assembly having adjustable telescopic support posts.
Figure 6:
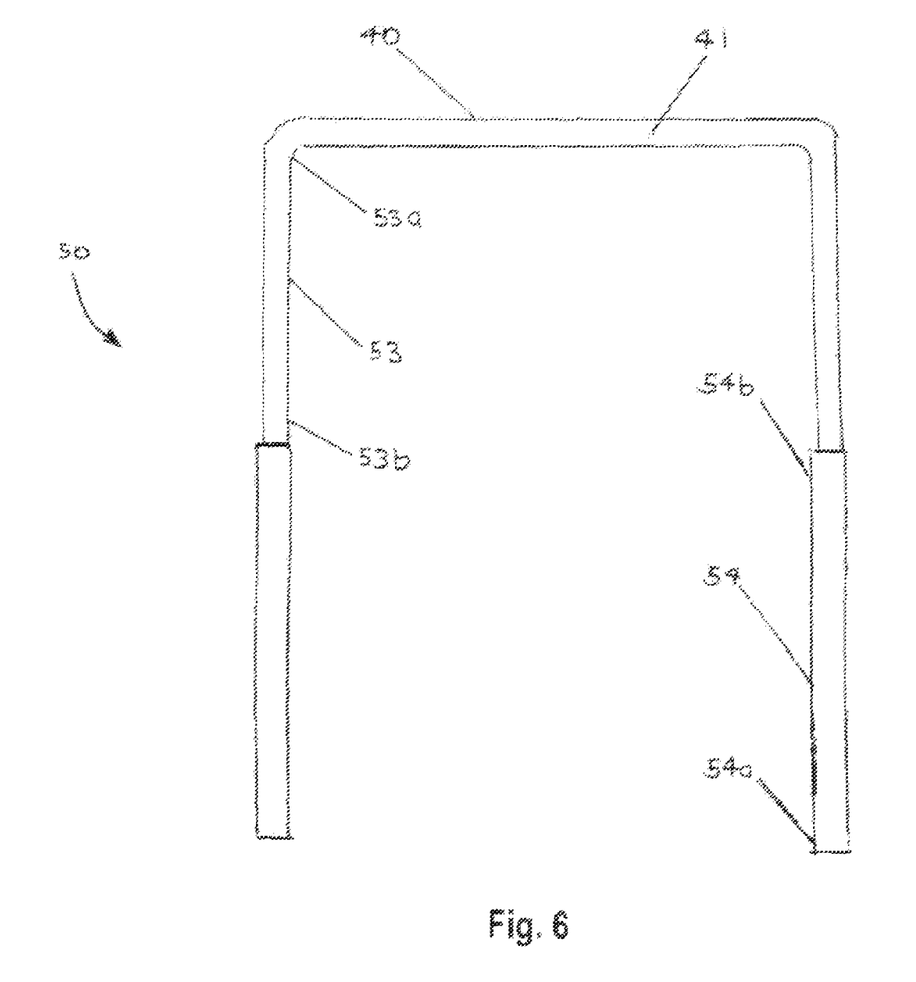
FIG. 6 is a front view of the handrail and support posts shown in FIG. 5.

The handrail 40 and support posts 50 may take the form of a single modular unit as shown in FIGS. 1-4 or may come as separate components that are connected by way of fittings such as welded tees, elbows and the like. For instance, as shown in FIGS. 5 & 6, the safety rail assembly 10 may include a bifurcated support post arrangement that includes adjustable telescoping support posts 50. Each support post 50 includes a first vertical post section 53 having a first end 53a for supporting the horizontal bar 40 and a second vertical post section 54 having a first end 54a mounted to the deck 21 and a second end 54b sized to telescopically receive a lower base end 53b of the first vertical post section 53. Accordingly, this arrangement advantageously permits the safety rail assembly 10 to be removeably mounted to the deck 21 by any conventional mounting technique known in the art while also permitting adjustments to the height of the handrail 40 to a desired level permitting unobstructed opening and closing of the passenger and/or driver-side doors 31.

In order to maintain the maximum width possible within the existing frame, the components of the safety rail assembly 10, namely the handrail 40 and the vertical posts 50, can be attached to each other using any suitable method of attachment, for instance, by weld or bolt of the edges. The vertical posts 50 are placed such that there is no conflict with the vehicle doors which open and close freely under the handrail 40. Alternatively or in combination with the retaining mechanism 60, the safety rail assembly 10 may include a provision for pivotally mounting the second end 52 to the deck 21 for movement between inclined, upright and declined positions while also permitting vertical adjustments to the distance between the handrail 40 and the deck 21. This pivotal design provides even further access to the interior of the automobile that has been secured on the deck 21.

The safety rail assembly 10 may be designed to reduce vibration and stress at the connections under highway conditions both for new vehicles and retrofitted vehicles. The components of the safety rail assembly 10 may be composed of a durable yet lightweight material adaptable to form hollow tubing of a selected uniform circular or rectangular cross-section. Such materials may take the form of a thermoplastic metal, or composite. It is preferred however, that the assembly 10, notably the handrail 40 and posts 50, is composed of metals such as aluminum or steel. The handrail 40 and support posts 50 may be coated with a color, preferably a bright color that correlates to safety and invites the user and/or operator to hold tightly for his/her security.

The gripping surface 41 of the handrail should be smooth, but not stick, to provide a surface texture that is welcoming to the driver and/or operator 22. The diameter of the handrail 40 is preferably about two inches in outer diameter to accommodate a typical hand so that the grip can curl around the gripping surface 41 but should be no less than one and one half inches nor greater than two and one half inches to suit the intended user profile. In this regard, the handrail 40 may include a plurality of handgrips 42 selectively placed thereon and sized to fit around the gripping surfaces 41 to enhance the gripping power of the user and/or operator while traversing the deck 21. Such handgrips 42 are substantially tubular-shaped and composed of a durable material, such as foam, rubber or plastic.

FIG. 2 illustrates a plurality of safety rail assemblies 10 provided on an eleven-car carrier 20 that includes a handrail 40 having a gripping surface 41 permitting a user to be safely guided on the deck 21 while traversing thereon, support posts 50 for supporting the handrail 40 and a fall arrest safety assembly 70 that mitigates or otherwise prevents a user from falling from the deck 21 while traversing thereon, even in instances of hazardous conditions. The fall arrest safety assembly 70 may be removeably secured to the handrail 40 using one or more double locking-type safety rings 71. A length of flexible chord 72 having a first end removeably secured to at least one of the plurality of rings 71 and a second distal end removeably secured to a safety harness 73 sized for receipt by the user and/or operator. Any lanyard-harness combination known in the art may be used to effectuate this fall arrest safety feature. Thus, in the event the wearer of the harness 73 slips and loses his/her grip on the handrail 40, the fall arrest safety assembly 70 prevents them from falling from the deck 21. Thus, the fall arrest safety assembly 70 serves as a third safety feature that prevents occupational hazardous that heretofore have been prevalent on transport carriers 20.

The fall arrest safety assembly 70 may also include a pair of stop mechanisms 74 such as an annular stop, circular ring or bolt provided on each end of the handrail 40 for maintaining the position of the fall arrest safety arrest assembly 70 on the handrail 40, particularly, the safety rings 71 so that the user and/or operator's hand or the lanyard does not run downwardly relative to the posts 50. Where there is an appreciable angle (e.g., over seven degrees) that might cause the hand of the user and/or operator or the safety rings 71 to slide down the angled handrail 40, then additional stops 74 may be applied at the time of fabrication. For more sophisticated users, the handrails 40 may become anchorage points for one or more fall arrest assemblies 70 whereby shock-absorbing lanyards are used for either direct attachment with large snap hooks and full body harness worn according to manufacturer labels and instructions and which slide along the U-bar until they reach a stop for safety purposes. Any such fall arrest assembly 70 should, however, must meet the same requirements of ANSI Z359.1 Personal Fall Arrest Systems.

Figure 9:
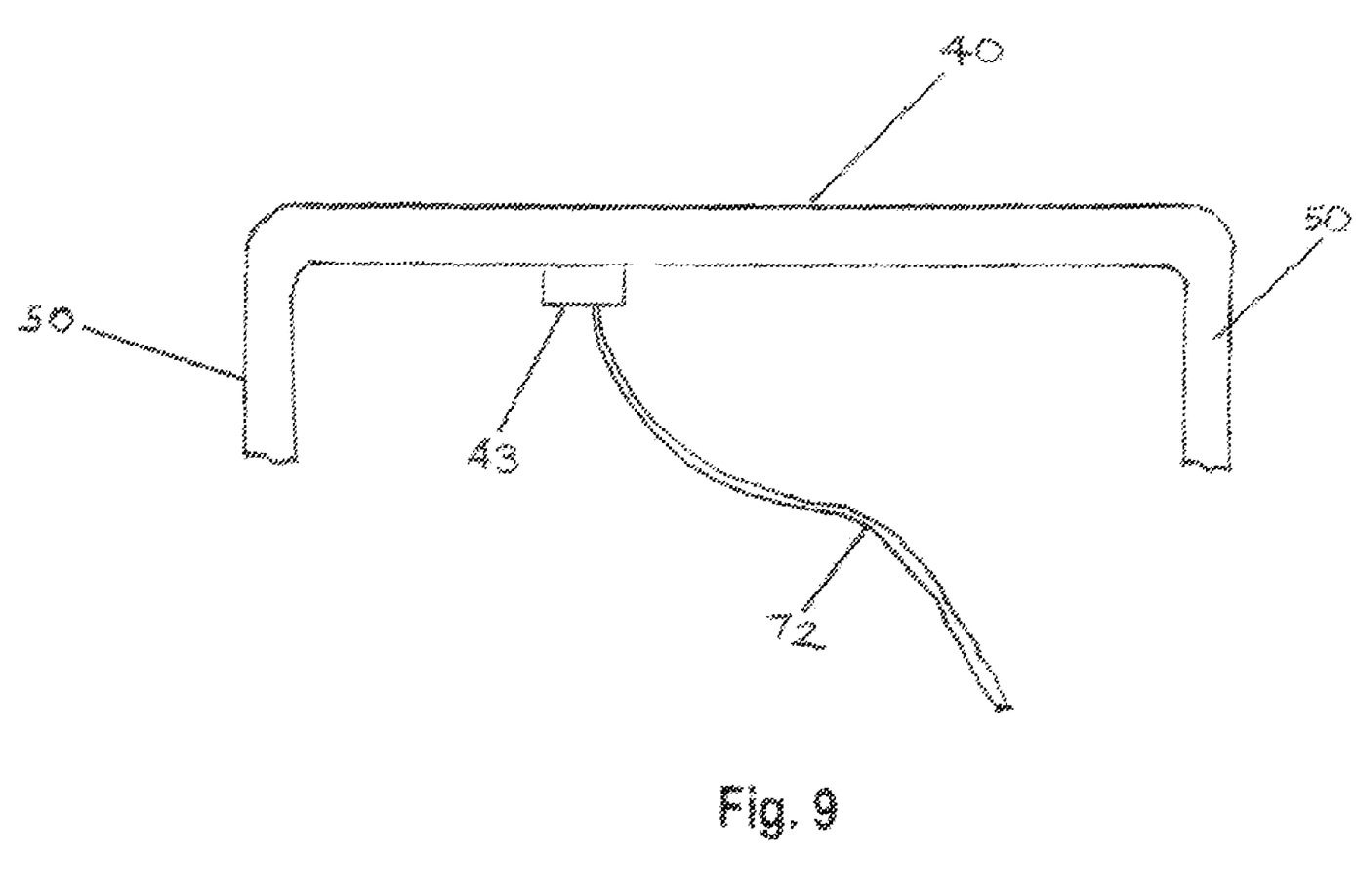
FIGS. 9 and 10 are front and section views of an embodiment of a fall arrest safety assembly.
Figure 10:
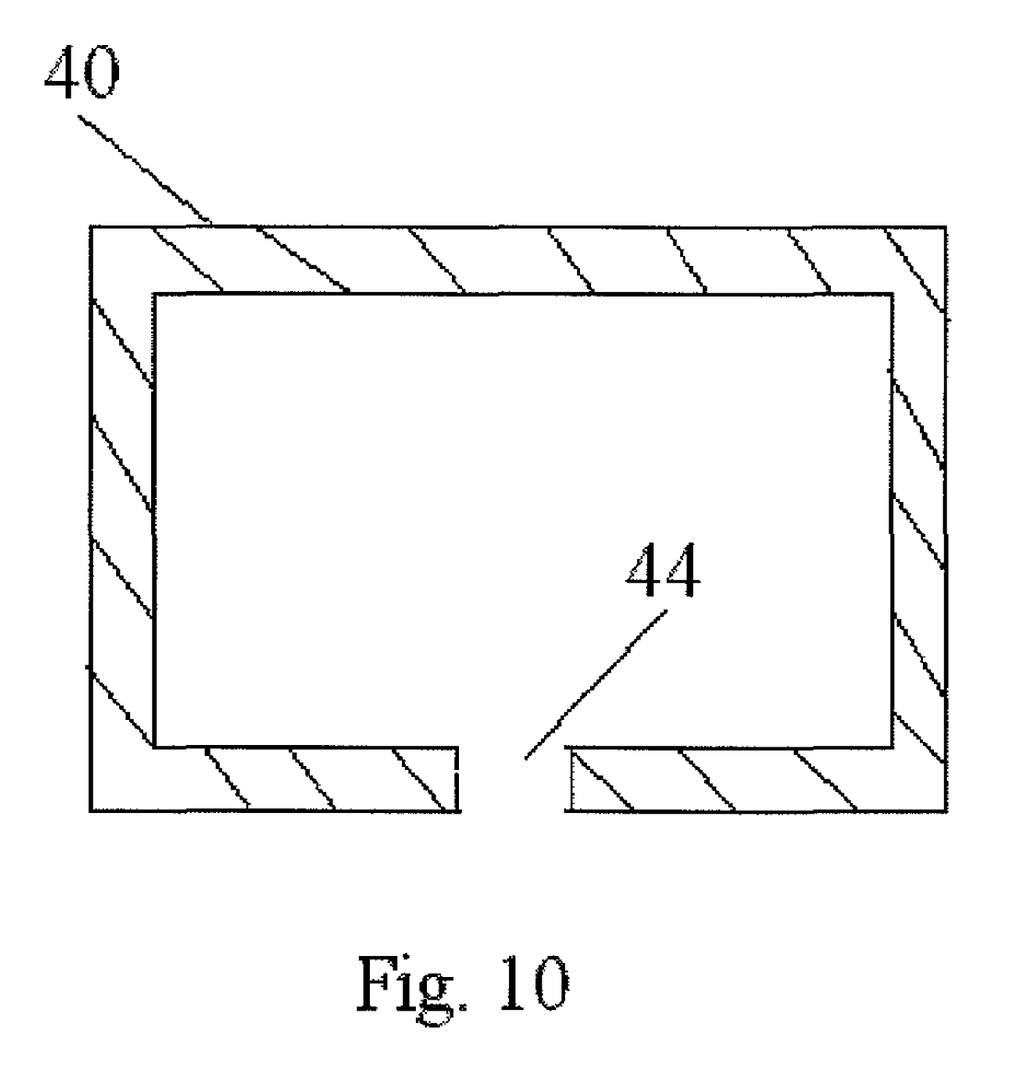

As illustrated FIGS. 9 and 10, still more sophisticated users may use a handrail 40 equipped with one or more internal sliding mechanisms 43 that emerge from underneath handrail 40 to provide smooth, relatively unobstructed travel on a bearing to help avoid sticking and frustration. In such an embodiment, the handrail 40 is provided with a longitudinal groove or slot 44 extending underneath the surface thereof which receives one or more sliding mechanisms 43 which are slidably moveable within the slot 44. The lanyard-harness combination described herein may thereby be attached to the sliding mechanism 43. Thus, the sliding mechanism 43 having an internal roller assembly moves along the slot with freedom and ease and the groove and may be protected from many weather conditions by a variety of means including stainless steel, lubrication and brush or a flexible cover.

It is apparent that innumerable variations of the preferred embodiments described hereinbefore may be utilized. However, all such variations within the spirit and scope of the invention are deemed to be covered by the following claims.

What is claimed is:

1. A transport carrier having a portable safety rail assembly mounted on a deck thereof for transporting and supporting at least one automobile having passenger and driver-side doors, said portable safety rail assembly comprising:

an opening permitting one of said doors to swing open therethrough and allow access by a user to the interior of the automobile;

a handrail provided a predetermined vertical distance of at least 66 inches relative to the upper surface of the deck, said handrail having a gripping surface permitting the user to maintain his balance on the deck while traversing thereon;

a pair of support posts spaced apart a predetermined lateral distance, each one of said support posts having a first end supporting said handrail and a second end removably mounted to the deck by a retaining assembly, said retaining assembly permitting selective vertical displacement of said handrail relative to the upper surface of the deck so as to position said handrail at said predetermined vertical distance said predetermined vertical distance and said predetermined lateral distance creating said opening permitting unobstructed opening and closing of the door ; and a fall arrest safety assembly removably secured to said handrail for preventing a user from falling from the deck while traversing thereon.

2. The portable safety rail assembly of claim 1, wherein said fall arrest assembly is moveably supported by a longitudinal slot horizontally extending underneath the surface of said handrail, said slot sized to receive a latch mechanism that is slidable within said slot, a length of flexible chord having a first end securely attached to said latch mechanism and a second distal end securely attached to a safety harness sized for receipt by a user.

3. The portable safety rail assembly of claim 1, wherein said fall arrest assembly includes a plurality of safety rings provided on said handrail for sliding engagement thereon.

4. The portable safety rail assembly of claim 3, wherein said fall arrest assembly further comprises a length of flexible chord having a first end removably secured to one of said plurality of rings and a second end removably secured to a safety harness sized for receipt by the user.

5. The portable safety rail assembly of claim 4, further comprising a pair of stop mechanisms provided concentrically placed around said handrail at respective ends of said handrail for abutting said safety rings to thereby maintain the fall arrest safety arrest assembly on the handrail.

6. The portable safety rail assembly of claim 1, wherein said handrail includes a plurality of handgrips concentrically placed thereon and sized to fit around said handrails to enhance the gripping power of the user while traversing the deck.

7. The portable safety rail assembly of claim 6, wherein said plurality of handgrips is substantially tubular-shaped and composed of a durable material.

8. The portable safety rail assembly of claim 7, wherein said durable material is one selected from the group consisting of foam, rubber and plastic.

9. The portable safety rail assembly of claim 1, wherein said retaining assembly comprises a plurality of collars securely attached to the deck, each one of said collars having an open channel sized to receive the second end of a respective one of said support posts, said channel permitting vertical displacement of said support posts while therein.

10. The portable safety rail assembly of claim 9, wherein said second end of said support posts is provided with a plurality of holes therethrough.

11. The portable safety rail assembly of claim 10, wherein the outer circumferential surface of each said collar is provided with a collar hole therethrough corresponding in size to and in axial alignment with a respective one of said plurality of holes of said second end of said support posts when said second end is received into said channel of said collar, said axial alignment facilitating the receipt of a latch device by said collar hole and said corresponding hole to selectively lock each one of said support posts to the deck while also placing said handrail at said predetermined vertical distance permitting opening and closing of the vehicle door when the automobile is placed on the deck.

12. The portable safety rail assembly of claim 11, wherein said latch device comprises at least one bolt sized for receipt by said collar hole and said corresponding hole.

13. The portable safety rail assembly of claim 12, wherein said at least one bolt comprises two bolts.

14. A transport carrier having a safety rail assembly mounted on a deck thereof for transporting and supporting at least one automobile having passenger and driver-side doors, said safety rail assembly comprising:

an opening permitting one of said doors to swing open therethrough and allow access by a user to the interior of the automobile;

a handrail provided a predetermined vertical distance of at least 66 inches above the upper surface of the deck, said handrail having a gripping surface permitting a the user to maintain his balance on the deck while traversing thereon;

telescopically moveable support posts for supporting said handrail, said telescopically moveable support posts being spaced apart a predetermined lateral distance of between and including a first post section having a first distal end for supporting said handrail and a second post section having a second base end mounted to the deck and a second distal end sized to receive a first base end of said first post section to facilitate selective movement between said support post sections to thereby displace said handrail at said predetermined vertical distance, wherein said predetermined vertical distance and said predetermined lateral distance defines said opening; and a fall arrest safety assembly removably secured to said handrail for preventing a user from falling from the deck while traversing thereon, said fall arrest assembly including a plurality of safety rings removably secured to said handrail, a length of flexible chord having a first end removably secured to at least one of said plurality of rings and a second distal end removably secured to a safety harness sized for receipt by the user.

15. The safety rail assembly of claim 14, wherein said second base end of said second post section is pivotally mounted to the deck to permit movement of said rail assembly when in a fully operable position between a substantially perpendicular position relative to the upper surface of the deck to an inclined position away from the automobile and a declined position toward the automobile.

16. The safety rail assembly of claim 14, further comprising a pair of stop mechanisms concentrically provided on said handrail for maintaining the position of said fall arrest safety assembly on said handrail.

17. The safety rail assembly of claim 14, wherein said second base end of said second post section is pivotally mounted to the deck to permit movement of said rail assembly when in a fully operable position between a substantially perpendicular position to an inclined position away from the automobile and a declined position toward the automobile relative to the upper surface of the deck.

18. A transport carrier having a safety rail assembly mounted on a deck thereof for transporting and supporting at least one automobile having at least one of passenger and driver-side doors, said safety rail assembly comprising:

an opening permitting one of said doors to swing open therethrough and allow access by a user to the interior of the automobile;

a handrail supported by support posts a predetermined vertical distance of at least 66 inches above the support surface, a retaining assembly connectable to the support posts for permitting selective adjustments to said predetermined vertical distance to a desired level above the an upper edge of at least one door of the automobile, said predetermined vertical distance permitting unobstructed opening and closing of the at least one door, said retaining assembly including a plurality of brackets permitting pivotal displacement of said support posts when the safety rail assembly is placed in an operable position; and a fall arrest safety assembly removably secured to a longitudinal slot extending underneath the surface of said handrail for preventing the user from falling said fall arrest assembly including a latch mechanism slidable within said slot, a length of flexible chord having a first end removably secured to said latch mechanism and a second end removably secured to a safety harness sized for receipt by a user.

19. The safety rail assembly of claim 18, wherein said said support posts are spaced apart a predetermined lateral distance of between 102 and 108 inches, said predetermined vertical distance and said predetermined lateral distance combining to form said opening.

* * * * *